United States Patent
Ling et al.

(10) Patent No.: US 10,095,575 B2
(45) Date of Patent: Oct. 9, 2018

(54) USER EQUIPMENT NODE, SERVER NODE AND METHODS PERFORMED IN SUCH NODES FOR PERFORMING FILE REPAIR PROCEDURE

(75) Inventors: Robbie Ling, Shanghai (CN); Emer Chen, Shanghai (CN); Jinyang Xie, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 90 days.

(21) Appl. No.: 14/415,056

(22) PCT Filed: Jul. 27, 2012

(86) PCT No.: PCT/CN2012/079251
§ 371 (c)(1),
(2), (4) Date: Apr. 10, 2015

(87) PCT Pub. No.: WO2014/015511
PCT Pub. Date: Jan. 30, 2014

(65) Prior Publication Data
US 2015/0269016 A1    Sep. 24, 2015

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/076* (2013.01); *G06F 11/0709* (2013.01);
(Continued)

(58) Field of Classification Search
CPC ............ G06F 11/0793; G06F 11/0709; G06F 11/076; H04L 65/1069; H04L 65/4076;
(Continued)

(56) References Cited

U.S. PATENT DOCUMENTS 4,110,558 A * 8/1978 Kageyama ............ H04L 1/0002
375/357
6,151,696 A * 11/2000 Miller ................... H04L 1/1614
714/748

(Continued)

FOREIGN PATENT DOCUMENTS

WO    WO 2005/104421 A1    11/2005
WO    2009/140842           11/2009

OTHER PUBLICATIONS

Dictionary definition of "FEC", retrieved from wikipedia "https://en.wikipedia.org/wiki/Forward_error_correction" on Apr. 12, 2017.*
(Continued)

*Primary Examiner* — Yair Leibovich
(74) *Attorney, Agent, or Firm* — Baker Botts, LLP

(57) ABSTRACT

A user equipment node, upon determining that the data loss in a requested file is above, or likely to be above a threshold value, transmits a delivery missing report to a server node indicating that the data loss in the requested file is above the threshold value. The delivery missing report is used by the server node for determining whether or not a multicast file repair procedure should be enabled, based on the number of delivery missing reports it has received from other user equipment nodes. This enables a point-to-multipoint file repair procedure to be enabled sooner, and prevent a flood of point-to-point file repairs.

20 Claims, 7 Drawing Sheets

(51) Int. Cl.
  *H04L 12/18* (2006.01)
  *H04L 29/06* (2006.01)
  *H04L 29/08* (2006.01)
(52) U.S. Cl.
  CPC ........ *H04L 12/189* (2013.01); *H04L 12/1868* (2013.01); *H04L 65/1069* (2013.01); *H04L 65/4076* (2013.01); *H04L 67/06* (2013.01); *H04L 67/10* (2013.01)
(58) Field of Classification Search
  CPC ....... H04L 67/06; H04L 67/10; H04L 12/189; H04L 12/1868
  USPC ........................................................ 714/47.2
  See application file for complete search history.

(56) References Cited

U.S. PATENT DOCUMENTS

| | | | | |
|---|---|---|---|---|
| 6,611,872 | B1* | 8/2003 | McCanne | H04L 12/1836 370/390 |
| 9,871,732 | B2* | 1/2018 | Lewin-Eytan | H04L 47/15 |
| 2002/0087685 | A1* | 7/2002 | Lassen | H04L 67/32 709/225 |
| 2004/0213214 | A1* | 10/2004 | Jung | H04B 7/2637 370/352 |
| 2005/0216812 | A1 | 9/2005 | Leon et al. | |
| 2006/0262806 | A1 | 11/2006 | Bouazizi | |
| 2009/0006641 | A1* | 1/2009 | Yaqoob | H04L 12/1868 709/231 |
| 2011/0199975 | A1* | 8/2011 | Wu | H04L 1/1812 370/328 |
| 2011/0209025 | A1* | 8/2011 | Takahashi | H03M 13/356 714/752 |
| 2013/0058248 | A1* | 3/2013 | Singh | H04L 43/0876 370/252 |
| 2013/0254634 | A1* | 9/2013 | Luby | H04L 67/06 714/776 |
| 2017/0126256 | A1* | 5/2017 | Salomons | H04L 1/0009 |
| 2017/0171589 | A1* | 6/2017 | Phillips | G11B 27/10 |
| 2017/0171610 | A1* | 6/2017 | Nair | H04N 21/2362 |

OTHER PUBLICATIONS

Dictionary definition of "NAK", retrieved from wikipedia "https://en.wikipedia.org/wiki/Acknowledgement_(data_networks)" on Apr. 12, 2017.*

3rd Generation Partnership Project, "3GPP TS 26.346 V9.7.0" date: Jun. 2012, pp. 1, 21-22, 27, 32, 45, 79, 81-83, 85, 88.*

ETSI TS 126 346 V9.3.0; Universal Mobile Telecommunications System (UMTS); LTE; Multimedia Broadcast/Multicast Service (MBMS); Protocols and codecs (3GPP TS 26.346 version 9.3.0 Release 9), Jun. 2010.

Extended European Search Report for Application No./Patent No. 12881920.8-1870 2878098 PCT/CN2012079251, dated Nov. 20, 2015.

ETSI TS 125 346 v9.1.0; Technical Specification; Universal Mobile Telecommunications System (UMTS); Introduction of the Multimedia Broadcast/Multicast Service (MBMS) in the Radio Access Network (RAN); Stage 2 (3GPP TS 25.346 version 9.1.0 Release 9), Apr. 2010.

ETSI TS 126 346 v10.4.0; Technical Specification; Universal Mobile Telecommunications System (UMTS); LTE; Multimedia Broadcast/Multicast Service (MBMS); Protocols and codecs (3GPP TS 26.346 version 10.4.0 Release 10), Jul. 2012.

International Search Report for International application No. PCT/CN2012/079251, dated May 2, 2013.

Notification of the First Office Action issued by The State Intellectual Property Office of the People's Republic of China for Application No. 2012800761247 (Summary of the First Office Action attached) dated May 3, 2017.

Notification of the Third Office Action issued by the Chinese Patent Office for Application No. 201280076124.7—dated May 2, 2018.

* cited by examiner

USER EQUIPMENT NODE, SERVER NODE AND METHODS PERFORMED IN SUCH NODES FOR PERFORMING FILE REPAIR PROCEDURE

PRIORITY

This nonprovisional application is a U.S. National Stage Filing under 35 U.S.C. § 371 of International Patent Application Serial No. PCT/CN2012/079251, filed Jul. 27, 2012 and entitled "User Equipment Node, Server Node And Methods Performed In Such Nodes For Performing File Repair Procedure."

TECHNICAL FIELD

The present invention relates to a user equipment node, a server node, and methods performed in such nodes for performing a file repair procedure.

BACKGROUND

In current video and file delivery solutions, almost all mobile operators support and use a unicast mode of delivering files to users. Unicast is the sending of data to a single network destination identified by a unique address. Unicast is triggered by the end user when a data file is required, and the file delivery from a server node occupies dedicated radio resources. Such a network is shown in FIG. 1a, where a server node 101 (or sender) transmits data files to user equipment nodes (or receivers) $103_1$ to $103_N$, via one or more intermediate nodes 105. As can be seen, files are delivered in unicast mode, such that the same file being transmitted to user equipment nodes $103_1$ and $103_2$ results in the same file being delivered twice, in parallel, between certain nodes. In the mobile network, the radio resource is limited and depending upon demand, the support for users is limited, and end user quality of experience cannot always be guaranteed.

Multimedia Broadcast/Multicast Service (MBMS) is a Point-to-Multipoint (PtM) service offered via cellular networks which overcomes the limitations of unicast file delivery, and opens up opportunities for operators to off-load premium content and file delivery to mobile and fixed devices in geographic locations. Such a solution is shown in FIG. 1b, where a file is delivered in a point-to-multipoint manner between a server node 101 and one or more user equipment nodes or receivers $103_1$ to $103_N$.

Evolved MBMS (eMBMS) is used to denominate an eMBMS service in the Evolved Packet Core (EPC) Solution including evolved UMTS Terrestrial Radio Access Network (e-UTRAN) and UTRAN Access.

MBMS download can be used to deliver an arbitrary number of files from a single source to many receivers. MBMS download typically makes use of the File Transport over Unidirectional Transport protocol (FLUTE, RFC3926), for file delivery. FLUTE is designed for massive file delivery over unidirectional links such as those used for digital broadcasts.

The purpose of a file repair procedure is to repair lost or corrupted file fragments from the MBMS download data transmission.

The technical specification of the 3$^{rd}$ Generation Partnership Project (3GPP) relating to RFC 26.346, entitled "Multimedia Broadcast/Multicast Service (MBMS); Protocols and codecs" has defined a point-to-point (PtP) file repair procedure, and mechanisms to prevent a flood of file repair requests from user equipment nodes.

FIG. 2 illustrates a scheme defined in RFC 26.346, whereby after transmission of a file has been completed, there exists a back-off time 201 before user equipment nodes can request a file repair procedure using signals 203, 205, that communicate between a user equipment node and a file repair server 207, these back-off times being randomly selected for different user equipment nodes, such that a flood of point-to-point file repair requests are not sent at the same time.

Although this random distribution of file repair requests helps prevent system failure due to overload, the mechanism still has the disadvantage of being an inefficient way of processing file repair requests.

SUMMARY

It is an aim of the present invention to provide a method and apparatus which obviate or reduce at least one or more of the disadvantages mentioned above.

According to a first aspect of the invention, there is provided a method in a user equipment node of a network, for performing a file repair procedure, wherein the user equipment node is adapted to receive one or more files from a server node. The method comprises the steps of transmitting a joining request to a server node, the joining request indicating that the user equipment wishes to join a channel for receiving a requested file. Data corresponding to the requested file from the server node is received. The user equipment node determines if the data loss in the requested file is above, or likely to be above a threshold value. If so, a delivery missing report is transmitted to the server node indicating that the data loss in the requested file is above the threshold value, wherein the delivery missing report is for use by the server node for determining whether or not a multicast file repair procedure should be enabled.

According to another aspect of the invention, there is provided a user equipment node for use in a network where one or more files are delivered to the user equipment node from a server node. The user equipment node comprises a transmitting unit configured to transmit a joining request to a server node, the joining request indicating that the user equipment node wishes to join a channel for receiving a requested file. A receiving unit is configured to receive data corresponding to the requested file from the server node. A processing unit is adapted to determine if the data loss in the requested file is above, or likely to be above a threshold value, and, if so control the transmitting unit to transmit a delivery missing report to the server node indicating that the data loss in the requested file is above the threshold value. The delivery missing report is for use by the server node for determining whether or not a multicast file repair procedure should be enabled.

According to a second aspect of the invention, there is provided a method in a server node of a network, for providing a file repair procedure in connection with a file being delivered to a plurality of user equipment nodes. The method comprises the steps of receiving a delivery missing report from a user equipment node corresponding to the file being delivered, and determining how many delivery missing reports have been received from other user equipment nodes for the corresponding file being delivered. A multicast file repair procedure is enabled if the number of delivery missing reports is above a multicast threshold value.

According to another aspect of the invention, there is provided a server node for providing a file repair procedure in connection with a file being delivered to a plurality of user equipment nodes in a network. The server node comprises a transmitting unit adapted to transmit a requested file to one or more user equipment nodes. A receiving unit is adapted to receive a delivery missing report from a user equipment node, the delivery missing report corresponding to the file being transmitted. A processing unit is adapted to determine how many delivery missing reports have been received from other user equipment nodes for the file being transmitted, wherein the processing unit is further adapted to enable a multicast file repair procedure if the number of delivery missing reports is above a multicast threshold value.

According to example embodiments, a file can be delivered between a server node and a user equipment node using a file transport over unidirectional transport, FLUTE, protocol, and/or wherein the network provides an evolved multimedia broadcast multicast service, eMBMS, service.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments of the present invention are aimed at providing an improved file repair procedure. The embodiments are based on a server node, such as a Broadcast-Multicast Service Centre (BM-SC) being able to determine how many users (user equipment nodes) would like to perform a file repair procedure before the BM-SC has finished delivering the particular file in question, for example by identifying which common symbol blocks and/or how many symbol blocks will need to be repaired. As will be described in further detail in the various embodiments below, a BM-SC can decide to enable a point-to-multipoint file repair procedure by receiving information from user equipment nodes, in the form of delivery missing reports, upon the user equipment nodes joining a channel to receive a particular file delivery.

The embodiments of the invention are therefore based on defining an interface between user equipment nodes and a BM-SC node, whereby user equipment nodes report delivery missing status information when they join a broadcast service, for example according to whether a threshold value of data loss has occurred (or is likely or predicted to occur). The delivery missing status information (for example in the form of delivery missing reports) can be sent to an address specified by a delivery missing report URI, for example. As will be explained below, the URI and/or threshold value can be delivered according to a User Service Description (USD) of the RFC 26.346 specification. It is noted that other methods of delivering this information are also intended to be covered by the invention. The BM-SC can analyze the delivery missing status reports it receives, and determine whether a point-to-multipoint file repair is necessary. This can be performed in advance of when would otherwise be possible, for example if user equipment nodes reported their missing status after a file delivery has been completed.

Figure 1A:
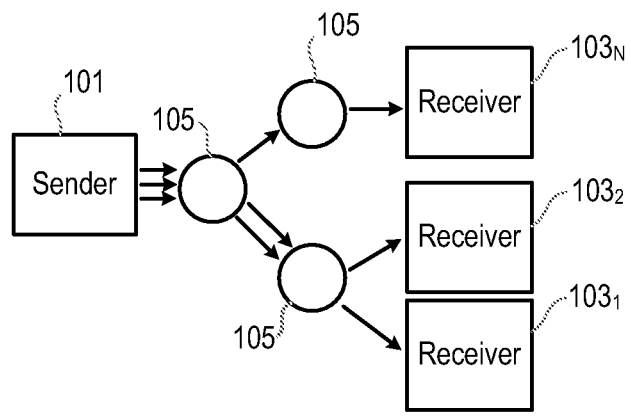
FIGS. 1a and 1b show methods of transmitting files using unicast and multicast modes of operation.
Figure 1B:
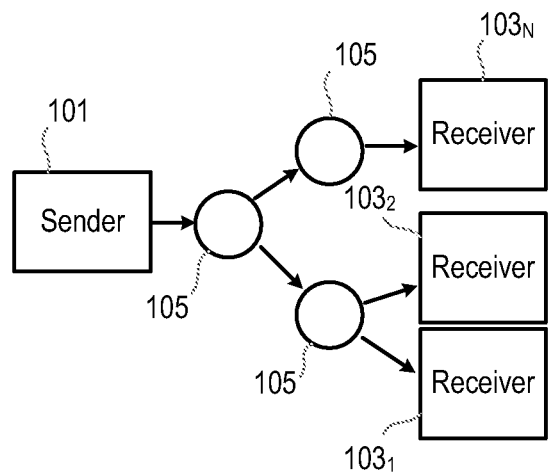
Figure 2:
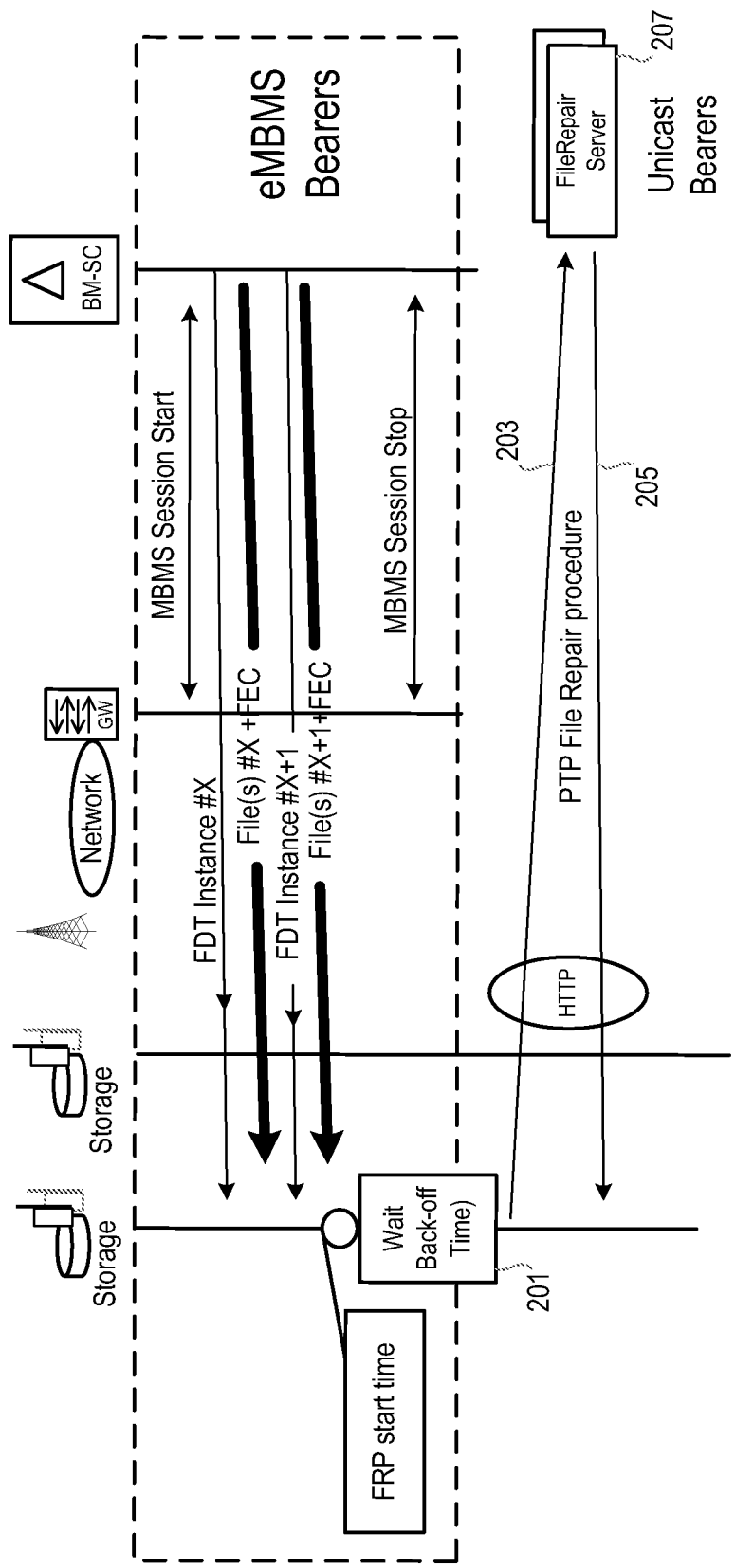
FIG. 2 shows a conventional file repair procedure.
Figure 3:
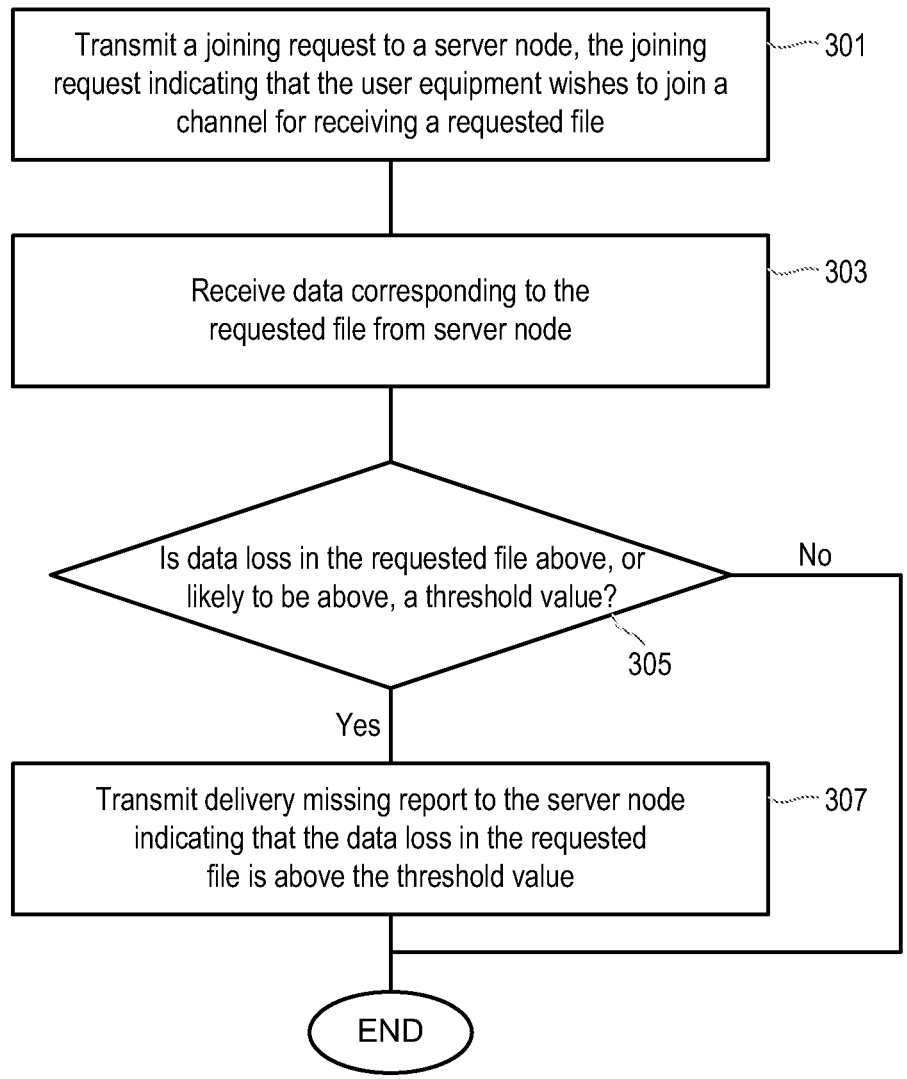
FIG. 3 shows a method according to an embodiment of the present invention.

FIG. 3 shows a method according to a first embodiment of the present invention, performed in a user equipment node of a network where a file repair procedure is to be performed, whereby the user equipment node is adapted to receive one or more files from a server node. The method comprises the step of transmitting a joining request to a server node, the joining request indicating that the user equipment wishes to join a channel for receiving a requested file, step 301, for example a broadcast file. In step 303 data corresponding to the requested file is received from the server node. It is then determined, in step 305, if the data loss in the requested file is above, or likely to be above a threshold value. If so, a delivery missing report is transmitted to the server node, step 307, indicating that the data loss in the requested file is above the threshold value. The delivery missing report is for use by the server node for determining whether or not a multicast file repair procedure should be enabled. If it is determined in step 305 that the data loss in the requested file is not above (or not likely to be above) a threshold value, then according to this embodiment no delivery missing report is sent.

Prior to the step of transmitting a joining request, it is noted that the method may comprise the step of receiving User Service Description (USD) metadata fragments containing an address, such as a URI address where delivery missing reports are to be sent, and/or the threshold value to be used in assessing the data loss. These identify when and how to send the missing data report(s), in step 300. The USD metadata fragments can be received during a USD discovery and announcement procedure.

It is also noted that, as will be discussed in other embodiments below, when the data loss is below a threshold value, the user equipment node may be configured to send a delivery missing report, in certain circumstances, specifically requesting a point-to-point repair.

The delivery missing report sent in step 307 may comprise a simple status report indicating that data loss is above a threshold value, hence allowing the server node to decide whether the UE should be directed to a point-to-point repair procedure or a point-to-multipoint repair procedure (for example based on whether the server node has received delivery missing reports from other user equipment nodes for the same file repair procedure). Alternatively, the delivery missing report sent in step 307 may comprise a specific point-to-point repair request, which the server node can chose to obey, or redirect to a point-to-multipoint file repair procedure, depending upon the number of delivery missing reports received from other user equipment nodes for the same file.

By sending a delivery missing report, this enables a server node to gather such delivery missing reports from multiple user equipment nodes in order to foresee the extent of data repair that is required, and thereby prevent a flood of point-to-point repairs. Instead, the server node, as will be described later in the application, can enable a multicast repair procedure when the number of received delivery missing reports is above a multicast threshold.

According to one embodiment, the delivery missing report is transmitted to the server node prior to the completion of the reception of the requested file from the server node.

By sending the delivery missing report before the file delivery has been completed, this enables the server node to foresee how many user equipment nodes will require a major file repair, which means that a multicast (or point-to-multipoint) file repair procedure can be enabled sooner, and before a file delivery has been completed.

According to one embodiment the delivery missing report is delivered randomly during a period when the file delivery is still ongoing.

According to another embodiment the delivery missing report is transmitted to the server node soon after joining the channel, for example within a predetermined period of the user equipment node joining the channel. For example, if the user equipment node determines soon after joining a particular channel that a certain percentage of the file has already been broadcast, say 40% for example, then the user equipment node is able to determine at that point that the data loss is going to be above the threshold value, or going to be above the threshold value when the complete file is eventually received. It is noted that the threshold value can be set at any value, depending on a particular application. As mentioned above, the threshold value can be set in the User Service Description metadata fragments, and delivered to user equipment nodes during a USD discovery and announcement procedure. The URI and threshold can be configured before the USD delivery. It is noted that the threshold value may be dynamically adapted during use, if required, by updating or changing the threshold value, for example if a system wishes to change the level at which a point-to-multipoint file repair procedure is enabled. As such, in step 305 of FIG. 3, the step of determining if the data loss is above, or likely to be above the threshold value comprises the steps of: determining at which point in the file delivery process the user equipment node has joined the channel; determining how much data from the requested file has already been transmitted by the server node prior to the user equipment node joining the channel, and hence lost by the user equipment node; and using this information to determine if the data loss is above the threshold value.

This has the advantage that, by determining the joining point of the file delivery process; this enables the user equipment to foresee how much data will be lost in the file, i.e. anything that was sent prior to the user equipment joining that channel, which means that the delivery missing report can send useful information to the server node prior to the file delivery being completed.

If the server node determines that many user equipment nodes have requested as being missing, much of the same data from the same file, the server node can enable a point-to-multipoint file repair procedure, for example by transmitting a multicast file repair announcement.

Upon receiving such a multicast file repair announcement from a server node, the user equipment node can join the multicast file repair procedure.

According to one example, the user equipment node receives user service description (USD) metadata fragments, the USD metadata fragments including an address where a delivery missing report is to be transmitted and/or the threshold value for use in determining the data loss. The address and/or threshold value can be received during a USD announcement procedure, which forms part of a USD discovery/announcement procedure.

Figure 4:
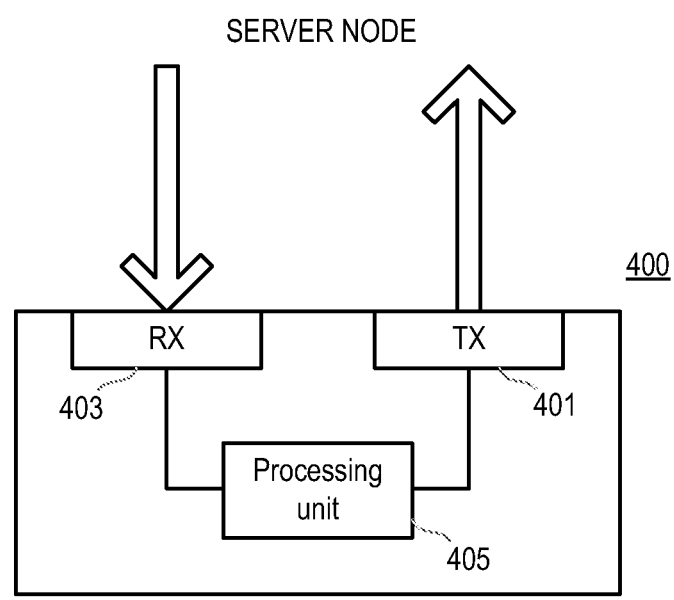
FIG. 4 shows an example of a user equipment node according to an embodiment of the present invention.

FIG. 4 shows a user equipment node 400 according to an embodiment of the invention, for use in a network where one or more files are delivered to the user equipment node from a server node. The user equipment node 400 comprises a transmitting unit 401 configured to transmit a joining request to a server node, the joining request indicating that the user equipment node wishes to join a channel for receiving a requested file. The user equipment node also comprises a receiving unit 403 configured to receive data corresponding to the requested file from the server node. A processing unit 405 is adapted to determine if the data loss in the requested file is above, or likely to be above a threshold value, and, if so control the transmitting unit 401 to transmit a delivery missing report to the server node indicating that the data loss in the requested file is above the threshold value. The delivery missing report is for use by the server node for determining whether or not a multicast file repair procedure should be enabled. It is noted that although the transmitting unit and the receiving unit are shown as separate units in FIG. 4, it will be appreciated that these may comprise a single unit, such as a single transceiver unit.

The receiving unit 403, prior to receiving the data corresponding to the requested file from the server node, can be configured to receive User Service Description metadata fragments, containing an address such as a URI which indicates where the delivery missing reports are to be transmitted. The USD metadata fragments can also be used to convey the threshold value that is to be used in determining the data loss.

The transmitting unit 401 can be configured to transmit the delivery missing report to the server node prior to the completion of the reception of the requested file from the server node.

The transmitting unit 401 can be further configured to transmit the delivery missing report to the server node within a predetermined period of the user equipment node joining the channel.

When determining if the data loss is above, or likely to be above a threshold value, the processing unit 405 is adapted to: determine the point at which the user equipment node has joined the channel in the file delivery process; determine how much data from the requested file has already been transmitted by the server node prior to the user equipment node joining the channel, and hence lost by the user equipment node; and from this information determine if the data loss is above the threshold value.

The receiving unit 403 is adapted to receive a multicast file repair announcement from a server node, with the user equipment node being adapted to join a multicast file repair procedure in response to receiving the multicast file repair announcement.

Figure 5:
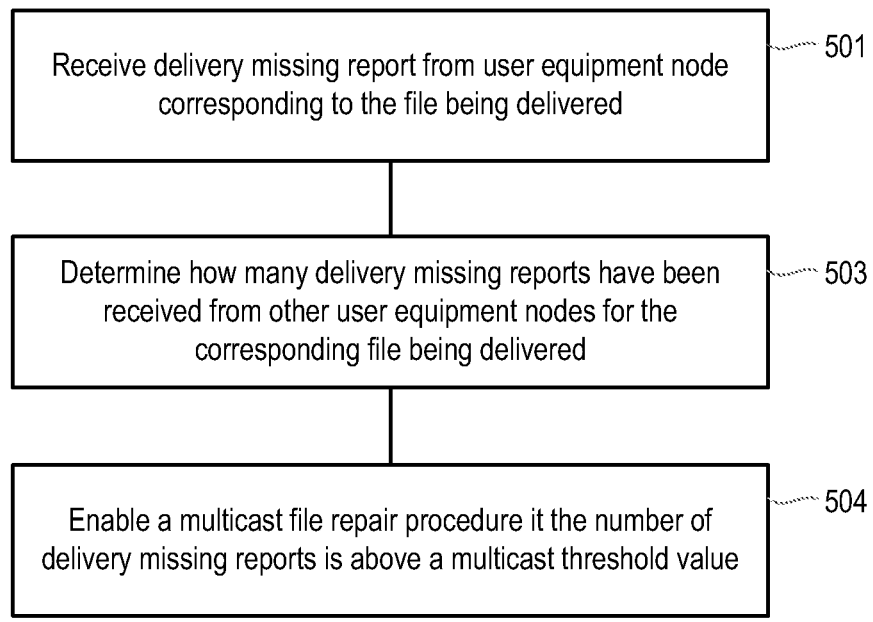
FIG. 5 shows a method according to another embodiment of the present invention.

FIG. 5 shows the steps performed by a server node of a network according to another embodiment of the invention, for providing a file repair procedure in connection with a file being delivered to a plurality of user equipment nodes. The method comprises the step of receiving a delivery missing report from a user equipment node corresponding to the file being delivered, step 501. In step 503, the server node determines how many delivery missing reports have been received from other user equipment nodes for the corresponding file being delivered. If the number of delivery missing reports is above a multicast threshold value, the server node enables a multicast file repair procedure, step 504.

In one example, the receiving step is performed prior to completion of the file being delivered to the plurality of user equipment nodes, for example when a user equipment node, as described above, sends its delivery missing report soon after joining a channel.

The step of enabling a multicast file repair procedure may comprise the step of transmitting a multicast file repair announcement, instructing the plurality of user equipment nodes to join a multicast file repair procedure.

The server node can be adapted to switch between a point-to-point file repair procedure and a point-to-multipoint file repair procedure depending on the number of delivery missing reports received in connection with the respective file.

The server node can be adapted to determine from a received delivery missing report the extent of the missing data in the file delivery to the corresponding user equipment node and, if below a second threshold value, transmit the missing data to the corresponding user equipment node using a point-to-point file repair procedure, for example if only a limited amount of missing data needs to be sent.

The server node may be adapted to transmit user service description, USD, metadata fragments, the USD metadata fragments including an address where a delivery missing report is to be transmitted and/or the threshold value for use by a user equipment node for determining the data loss. It is noted that the USD metadata fragments may also be transmitted by another node of the network.

Figure 6:
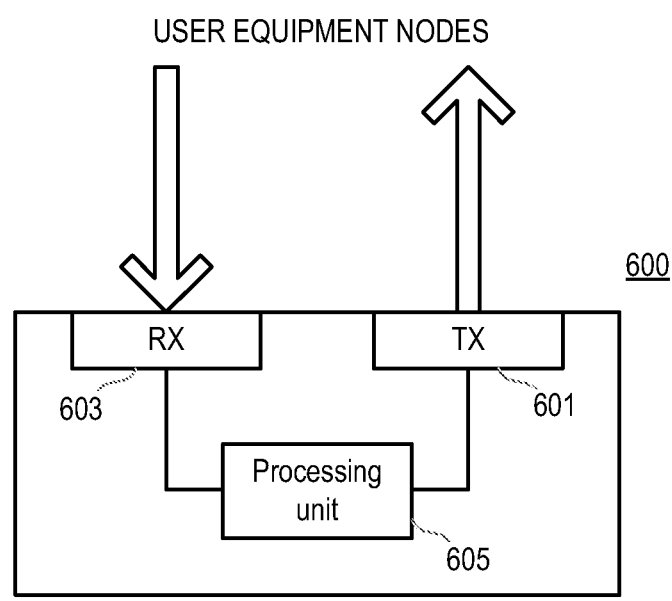
FIG. 6 shows an example of a server node according to an embodiment of the present invention.

FIG. 6 shows a server node 600 according to another embodiment of the invention, for providing a file repair procedure in connection with a file being delivered to a plurality of user equipment nodes in a network. The server node 600 comprises a transmitting unit 601 adapted to transmit a requested file to one or more user equipment nodes. A receiving unit 603 is adapted to receive a delivery missing report from a user equipment node, the delivery missing report corresponding to the file being transmitted. A processing unit 605 is adapted to determine how many delivery missing reports have been received from other user equipment nodes for the file being transmitted, and enable a multicast file repair procedure if the number of delivery missing reports is above a multicast threshold value.

The receiving unit 603 can be adapted to receive the delivery missing report prior to completion of the requested file being transmitted to the plurality of user equipment nodes.

The processor unit 605 can be further adapted, when enabling or triggering a multicast file repair procedure, to transmit a multicast file repair announcement via the transmitting unit 601, instructing the plurality of user equipment nodes to join the multicast file repair procedure.

The processing unit can also be adapted to control the server node to switch between a point-to-point file repair procedure and a point-to-multipoint file repair procedure depending on the number of delivery missing reports received in connection with the file being transmitted. For example, the server node could start sending point-to-point file repair procedures, and then switch to a multicast file repair procedure when the number of file delivery missing reports exceeds a multicast threshold value. In such a circumstance a user equipment node which has started to receive a point-to-point file repair procedure may be asked to switch to a point-to-multipoint file repair procedure instead.

The processing unit 605 can be adapted to determine from a received delivery missing report the extent of the missing data in the transmission of the file to a corresponding user equipment node, and, if the amount of missing data is below a second threshold value, transmit the missing data to the corresponding user equipment node using a point-to-point file repair procedure.

In the embodiments described above, according to one example a file can be delivered between a server node and a user equipment node using a file transport over unidirectional transport, FLUTE, protocol, and/or wherein the network provides an evolved multimedia broadcast multicast service, eMBMS, service. Other methods of transmitting the files are intended to be covered by embodiments of the invention.

The embodiments of the invention therefore prevent a flood of point-to-point repair procedures and improve the delivery efficiency, by defining a mechanism for the user equipment nodes and server nodes (e.g. BM-SC) to foresee the possibility of the data repair.

The delivery missing reports can be defined as an instance "DeliveryMissingReport" in the User Service Description data model of 3GPP RFC 26.346.

Extensions for the User Service Description schema to describe the downloadRegistration are defined in the example of the Schema below:

```xml
<?xml version="1.0" encoding="UTF-8"?>
<xs:schema mlns="urn:3GPP:metadata:2005:MBMS:userServiceDescription"
xmlns:xs="http://www.w3.org/2001/XMLSchema"
targetNamespace="urn:3GPP:metadata:2005:MBMS:userServiceDescription"
elementFormDefault="qualified">
  <xs:element name="bundleDescription" type="bundleDescriptionType"/>
  <xs:complexType name="bundleDescriptionType">
    <xs:sequence>
      <xs:element name="userServiceDescription"
type="userServiceDescriptionType" maxOccurs="unbounded"/>
    <xs:any namespace="##other" minOccurs="0" maxOccurs="unbounded"
              processContents="lax"/>
    </xs:sequence>
    <xs:attribute name="fecDescriptionURI" type="xs:anyURI"
              use="optional"/>
    <xs:anyAttribute processContents="skip"/>
  </xs:complexType>
  <xs:complexType name="userServiceDescriptionType">
    <xs:sequence>
      <xs:element name="name" type="nameType" minOccurs="0"
              maxOccurs="unbounded"/>
      <xs:element name="serviceLanguage" type="xs:language"
              minOccurs="0" maxOccurs="unbounded"/>
```

-continued

```
    <xs:element name="requiredCapabilities"
            type="requirementsType" minOccurs="0"
            maxOccurs="1"/>
    <xs:element name="deliveryMethod" type="deliveryMethodType"
            maxOccurs="unbounded"/>
    <xs:element name="accessGroup" type="accessGroupType"
            minOccurs="0" maxOccurs="unbounded"/>
    <xs:element name="Delivery MissingReport" MinOccurs="0">
        <xs:complexType>
          <xs:sequence>
            <xs:element name="DeliveryMissingReportURL"
                type="xs:anyURI" />
            <xs:sequence>
            <xs:attribute name="threshold" type="xs:unsignedInt"
                use="optional" default="50"
          <xs:complexType>
      <xs:element>
      <xs:any namespace="##other" minOccurs="0"
              maxOccurs="unbounded" processContents="lax"/>
    </xs:sequence>
    <xs:attribute name="serviceId" type="xs:anyURI" use="required"/>
    <xs:anyAttribute processContents="skip"/>
</xs:complexType>
<xs:complexType name="accessGroupType">
    <xs:sequence>
        <xs:element name="accessBearer" type="xs:string"
                maxOccurs="unbounded"/>
    </xs:sequence>
    <xs:attribute name="id" type="accessGroupIdType"
            use="required"/>
</xs:complexType>
<xs:complexType name="deliveryMethodType">
    <xs:sequence>
        <xs:any namespace="##other" minOccurs="0"
                maxOccurs="unbounded" processContents="lax"/>
    </xs:sequence>
    <xs:attribute name="accessGroupId" type="accessGroupIdType"
            use="optional"/>
    <xs:attribute name="associatedProcedureDescriptionURI"
            type="xs:anyURI" use="optional"/>
    <xs:attribute name="protectionDescriptionURI" type="xs:anyURI"
            use="optional"/>
    <xs:attribute name="sessionDescriptionURI" type="xs:anyURI"
            use="required"/>
    <xs:attribute name="accessPointName" type="xs:anyURI"
            use="optional"/>
    <xs:anyAttribute processContents="skip"/>
</xs:complexType>
<xs:complexType name="nameType">
    <xs:simpleContent>
        <xs:extension base="xs:string">
            <xs:attribute name="lang" type="xs:language"
                    use="optional"/>
        </xs:extension>
    </xs:simpleContent>
</xs:complexType>
<xs:simpleType name="accessGroupIdType"?
    <xs:restriction base="xs:nonNegativeInteger">
    </xs:restriction>
</xs:simpleType>
<xs:complexType name="requirementsType">
    <xs:sequence>
        <xs:element name="feature" type="xs:unsignedInt"
                minOccurs="1" maxOccurs="unbounded"/>
    </xs:sequences>
  </xs:complexType>
</xs:schema>
```

The section from <xs:element name="DeliveryMissingReport" minOccurs="0"> to </xs:element> corresponds to the Schema which has been included to provide the delivery missing reports.

Figure 7:
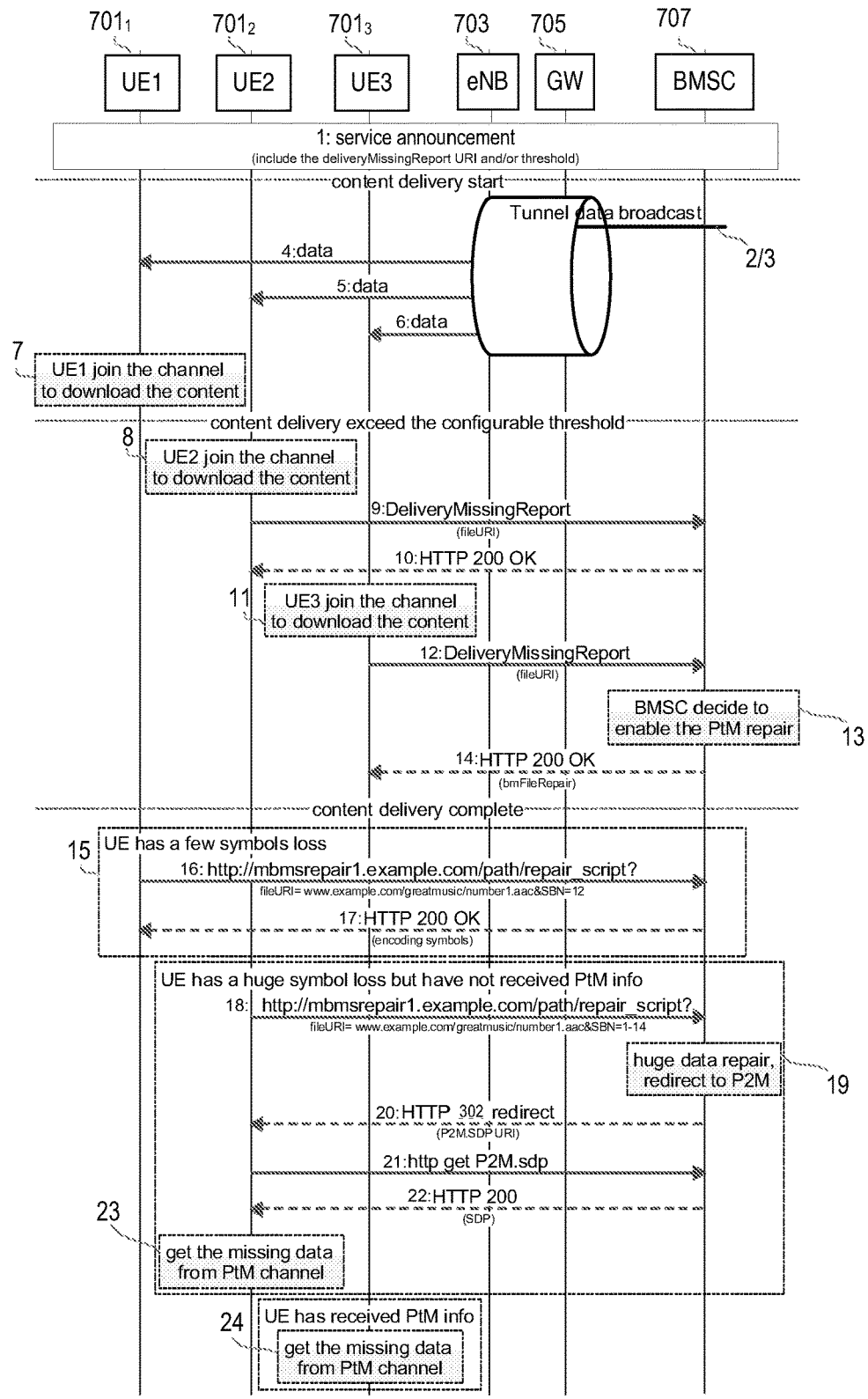
FIG. 7 shows a file repair procedure according to an embodiment of the present invention.

FIG. 7 shows an example of the exchange of data and commands between one or more user equipment nodes $701_1$ to $701_3$ and a server node, such as a BM-SC 707. Step 1 shows a service announcement that may be performed during an initialization stage, whereby the BM-SC 707 delivers an address or URI relating to where any delivery missing reports (deliveryMissingReport) are to be sent. This service announcement can also include the threshold value which is to be used by user equipment nodes, for determining at which threshold of data loss they should send a delivery missing report. This information can be provided in the form of User Service Description metadata fragments during a USD discovery/announcement procedure.

Steps 2 to 6 show a file being broadcast by a BM-SC 707, via a eNodeB 703 and Gateway 705.

In step 7 a first user equipment node 701$_1$ joins the channel to download the content, that is to receive a particular broadcast file. Since the first user equipment node 701$_1$ joins the channel early in the broadcast, no delivery missing report is sent. In other words, the user equipment node 701$_1$ will have determined that the data loss, or the likely data loss, is less than a threshold value.

In step 8 a second user equipment node 701$_2$ joins the channel to download the content, that is to receive the particular broadcast file. The second user equipment node 701$_2$ joins the channel at a later stage, and determines whether the data loss is above a threshold, or likely to be above the threshold. In the example this is determined to be the case, and the second user equipment node 701$_2$ therefore sends a delivery missing report to the BM-SC 707, step 9. This is sent to the URI previously received in the service announcement in step 1. The message may comprise, for example:

UE→BM-SC: post/deliveryMissingReport?fileURI=fileURI http/1.1

It is noted that the URI can be delivered over unicast or broadcast within the USD discovery and announcement procedure, or indeed according to some other procedure.

In step 10 the BM-SC 707 sends an acknowledgement signal to the second user equipment node 701$_2$, such as a HTTP 200 OK message. The BM-SC 707 has decided not to support point-to-multipoint file repair procedure at this stage, since only one delivery missing report has been received. In such case the message 10 can comprise a HTTP acknowledgement as mentioned above:

BM-SC→UE: http1.1 200 OK

Since only one user equipment node has reported a delivery missing report at this stage, the BM-SC cannot decide to enable a point-to-multipoint file repair, and therefore just responds that the BM-SC has received the reporting.

In step 11 a third user equipment node 701$_3$ joins the channel to download the content, that is, to receive the particular broadcast file. Since the third user equipment node joins the channel at an even later stage, the data loss will be even greater, and therefore also above the threshold value. The third user equipment node 701$_3$ therefore sends a delivery missing report to the BM-SC 707, step 12. This is sent to the URI previously received in the service announcement in step 1.

In step 13 the BM-SC 707, having analyzed the number of received delivery missing reports and determined that a multicast threshold has been met (i.e. delivery missing reports received from more than a multicast threshold of user equipment nodes), decides to enable a point-to-multipoint (multicast) file repair procedure. The point-to-multipoint announcement, step 14, is made to the third user equipment node 701$_3$, for example in a HTTP 200 OK message as shown below:

M-SC→UE: http1.1 200 OK with BmFileRepair SDP

The HTTP body shall include the BmFileRepair SDP. As such, the third user equipment node 701$_3$ will not initiate a point-to-point file repair procedure when the delivery is complete. Instead, as described in more detail below (steps 23/24), the third user equipment node 701$_3$ will join the point-to-multipoint file repair procedure, for example the BmFileRepair defined broadcast channel, including Temporary Mobile Group Identity (TMGI) information, multicast address and session start/stop time etc., to receive the missing data.

Step 15 shows that the first user equipment node 701$_1$ has lost a few symbols, and indicates this to the BM-SC 707 in step 16. Since the data loss is very small, the BM-SC 707 is able to send the missing symbols in the HTTP 200 OK message 17, rather than in a specific point-to-point repair procedure. This has the advantage of reducing the number of point-to-point file repair procedures.

Step 18 shows that the second user equipment node 701$_2$ has lost a large symbol loss, but has not received a point-to-multipoint file repair announcement, that is because it sent a delivery missing report to the BM-SC 707, before the BM-SC 707 had determined that the number of delivery missing reports was above a threshold (the multicast threshold used by the BM-SC 707 for determining when to enable point-to-multipoint repair). The large data loss is indicated in a message 18. As the second user equipment node 701$_2$ has not received a BmFilerepair SDP information, it will therefore send the point-to-point file repair request to BM-SC 707. BM-SC 707 could know that this user requests the huge missing data base on the user equipment IP or the missing request symbols information. For this implementation, it does not matter since both of these are known by BM-SC 707. Step 18 shall therefore be the same as the normal point-to-point file repair procedure, in that it shall wait for a random time However, upon determining that a huge data repair is needed, the BM-SC 707 sends a point-to-multipoint redirect message to the second user equipment node 701$_2$, step 20, for example via a HTTP 302 redirect message. Steps 21 and 22 show how the second user equipment node 701$_2$ obtains the point-to-multipoint file repair information. The BM-SC 707 uses the HTTP response status code 302 (Found—Redirection) to indicate to the second user equipment node 701$_2$ that the resource (file repair data) is temporarily available via a different URI. The temporary URI can be given by the Location field in the HTTP response and is the URI of the Session Description (SDP file) of the point-to-multipoint repair session.

In step 23 the second user equipment node 701$_2$ obtains the missing data from the point-to-multipoint channel. Thus, it can be seen that the second user equipment node 701$_2$ sends a repair request to the BM-SC 707, and if the BM-SC 707 finds that there is a large data repair required for this particular content, and a point-to-multipoint repair has been enabled, it will respond with a HTTP 302 message with a SDP URI to the second user equipment node. Since a point-to-multipoint repair was decided in step 13, the second user equipment node 701$_2$ will initially follow a normal point-to-point file repair procedure, and then be directed to a point-to-multipoint file repair procedure.

Step 24 shows that the third user equipment node 701$_3$, having already received its point-to-multipoint file repair information (i.e. in step 14, since this was after the BM-SC 707 had decided to enable a point-to-multipoint file repair procedure), therefore obtains the missing data from the point-to-multipoint channel. In other words, any user equipment nodes who have already received the point-to-multipoint service announcement information, do not need to send a file repair request again (such as not sending a point-to-point file repair request again). Such user equipment nodes receive the missing data through the point-to-multipoint repair procedure and then decode the content.

It can be seen from the above that, if a user equipment node joins the delivery channel too late, for example it joins the delivery channel after the channel has delivery X % of the content, the user equipment node sends a delivery missing report (deliveryMissingReport) to a BM-SC, indicating that it has a potentially large file repair procedure for this channel. If BM-SC receives multiple deliveryMissingReports, for example above a "multicast threshold level", it shall consider enabling the point-to-multipoint file repair procedure to improve the delivery efficiency, and the BM-SC 707 provides a point-to-multipoint service announcement for the new deliveryMissingReport request from the user equipment nodes.

The embodiments of the invention described above have the advantage of preventing a flood of unicast repair procedures, thereby improving the delivery efficiency, and saving the wireless resources The embodiments of the invention also have the advantage of launching the point-to-multipoint repair procedure in-advance (for example step 14 of FIG. 7), instead of the last minutes of receiving a point-to-point file repair request. Server nodes such as BM-SCs can foresee a huge repair and enable a BmFileRepair in-advanced. Upon a file download being complete, a user equipment node can then join a point-to-multipoint file repair procedure if the point-to-multipoint service announcement has been received, or join a point-to-point file repair procedure if no point-to-multipoint service announcement has been received.

The embodiments of the invention also have the advantage of helping network operators to plan the delivery of missing data.

It is noted that any method can be used in a user equipment node for determining the data loss in the file being received, and include calculating the missing data rate through the File Delivery Table (FDT) and FLUTE, and comparing with the threshold value defined by the initial service announcement. Data loss can comprise lost or corrupted file fragments during a file delivery itself, including data which has been lost due to the fact that the user equipment node has joined the channel after a certain point in the file delivery process.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a user equipment node of a network, for performing a file repair procedure, wherein the user equipment node is adapted to receive one or more files from a server node, the method comprising the steps of:
    receiving User Service Description (USD) metadata fragments including a Uniform Resource Indicator (URI) address where delivery missing reports are to be sent;
    transmitting a joining request to a server node, the joining request indicating that the user equipment wishes to join a channel for receiving a requested file;
    receiving data corresponding to the requested file from the server node;
    determining, based on the data loss in a fragment percentage of the requested file being received, if the data loss in the entire requested file is above, or likely to be above, a threshold value, and, if so:
    transmitting a delivery missing report to the server node indicating that the data loss in the entire requested file is above the threshold value, wherein:
        the delivery missing report is for use by the server node for determining whether or not a multicast file repair procedure should be enabled; and
        the delivery missing report is transmitted to the server node prior to the completion of the reception of the requested file from the server node.

2. A method as claimed in claim 1, wherein the delivery missing report is transmitted to the server node within a predetermined period of the user equipment node joining the channel.

3. A method as claimed in claim 1, wherein the step of determining, based on the data loss in a fragment percentage of the requested file being received, if the data loss in the entire requested file is above, or likely to be above, the threshold value comprises the steps of:
    determining at which point in the file delivery process the user equipment node has joined the channel;
    determining how much data from the requested file has already been transmitted by the server node prior to the user equipment node joining the channel, and hence lost by the user equipment node; and
    using this information to determine if the data loss is above the threshold value.

4. A method as claimed in claim 1, further comprising the steps of:
    receiving a multicast file repair announcement from the server node; and
    joining the multicast file repair procedure in response to receiving the multicast file repair announcement.

5. A method as claimed in claim 1, wherein the USD metadata fragments include the threshold value for use in determining the data loss.

6. A method as claimed in claim 1, wherein a file is delivered between a server node and a user equipment node using a file transport over unidirectional transport (FLUTE) protocol, and/or wherein the network provides an evolved multimedia broadcast multicast service (eMBMS) service.

7. A user equipment node for use in a network where one or more files are delivered to the user equipment node from a server node, the user equipment node comprising:
    a transmitter;
    a receiver; and
    one or more processors coupled to the transmitter and the receiver, the one or more processors configured to:
    receive User Service Description (USD) metadata fragments including a Uniform Resource Indicator (URI) address where delivery missing reports are to be sent;
    transmit a joining request to a server node, the joining request indicating that the user equipment node wishes to join a channel for receiving a requested file;
    receive data corresponding to the requested file from the server node;
    determine, based on the data loss in a fragment percentage of the requested file being received, if the data loss in the entire requested file is above, or likely to be above, a threshold value, and, if so transmit a delivery missing report to the server node indicating that the data loss in the entire requested file is above the threshold value, wherein:
        the delivery missing report is for use by the server node for determining whether or not a multicast file repair procedure should be enabled; and
        the one or more processors are configured to transmit the delivery missing report to the server node prior to the completion of the reception of the requested file from the server node.

8. A user equipment node as claimed in claim 7, wherein the one or more processors are configured to transmit the delivery missing report to the server node within a predetermined period of the user equipment node joining the channel.

9. A user equipment node as claimed in claim 7, wherein the one or more processors configured to determine, based on the data loss in a fragment percentage of the requested file being received, if the data loss in the entire requested file is above, or likely to be above, a threshold value comprise one or more processors configured to:
determine the point at which the user equipment node has joined the channel in the file delivery process;
determine how much data from the requested file has already been transmitted by the server node prior to the user equipment node joining the channel, and hence lost by the user equipment node; and
from this information determine if the data loss is above the threshold value.

10. A user equipment node as claimed in claim 7, wherein the one or more processors are configured to receive a multicast file repair announcement from the server node, the user equipment node being adapted to join the multicast file repair procedure in response to receiving the multicast file repair announcement.

11. A user equipment node as claimed in claim 7, wherein a file is delivered between a server node and a user equipment node using a file transport over unidirectional transport (FLUTE) protocol, and/or wherein the network provides an evolved multimedia broadcast multicast service (eMBMS) service.

12. A computer implemented method in a server node of a network, for providing a file repair procedure in connection with a file being delivered to a plurality of user equipment nodes, the method comprising the steps of:
transmitting User Service Description (USD) metadata fragments including a Uniform Resource Indicator (URI) address where delivery missing reports are to be sent;
receiving a delivery missing report from a user equipment node corresponding to the file being delivered, the delivery missing report indicating that, based on the data loss in a fragment percentage of the file being delivered, the data loss in the entire file being delivered is above, or likely to be above, a threshold value, wherein the delivery missing report is received prior to completion of the file being delivered to the plurality of user equipment nodes;
determining how many delivery missing reports have been received from other user equipment nodes for the corresponding file being delivered; and
enabling a multicast file repair procedure if the number of delivery missing reports is above a multicast threshold value.

13. A method as claimed in claim 12, wherein the enabling step comprises the step of transmitting a multicast file repair announcement, instructing the plurality of user equipment nodes to join a multicast file repair procedure.

14. A method as claimed in claim 12, wherein the server node is adapted to switch between a point-to-point file repair procedure and a point-to-multipoint file repair procedure depending on the number of delivery missing reports received in connection with the respective file.

15. A method as claimed in claim 12, wherein the server node is adapted to determine from a received delivery missing report the extent of the missing data in the file delivery to the corresponding user equipment node and, if below a second threshold value, transmit the missing data to the corresponding user equipment node using a point-to-point file repair procedure.

16. A method as claimed in claim 12, wherein the USD metadata fragments include the threshold value for use by a user equipment node for determining the data loss.

17. A server node for providing a file repair procedure in connection with a file being delivered to a plurality of user equipment nodes in a network, the server node comprising:
a transmitter;
a receiver; and
one or more processors coupled to the transmitter and the receiver, the one or more processors configured to:
transmit a requested file to one or more user equipment nodes;
transmit User Service Description (USD) metadata fragments including a Uniform Resource Indicator (URI) address where delivery missing reports are to be sent;
receive a delivery missing report from a user equipment node corresponding to the file being transmitted, the delivery missing report indicating that, based on the data loss in a fragment percentage of the file being transmitted, the data loss in the entire file being transmitted is above, or likely to be above, a threshold value, wherein the one or more processors are configured to receive the delivery missing report prior to completion of the requested file being transmitted to the plurality of user equipment nodes; and
determine how many delivery missing reports have been received from other user equipment nodes for the file being transmitted, wherein the one or more processors are configured to enable a multicast file repair procedure if the number of delivery missing reports is above a multicast threshold value.

18. A server node as claimed in claim 17, wherein the one or more processors are configured, when enabling a multicast file repair procedure, to transmit a multicast file repair announcement via the transmitter, instructing the plurality of user equipment nodes to join the multicast file repair procedure.

19. A server node as claimed in claim 17, wherein the one or more processors are configured to control the server node to switch between a point-to-point file repair procedure and a point-to-multipoint file repair procedure depending on the number of delivery missing reports received in connection with the file being transmitted.

20. A server node as claimed in claim 17, wherein the one or more processors are configured to determine from a received delivery missing report the extent of the missing data in the transmission of the file to a corresponding user equipment node, and, if the amount of missing data is below a second threshold value, transmit the missing data to the corresponding user equipment node using a point-to-point file repair procedure, or using a HTTP protocol.

* * * * *